United States Patent [19]

Gold

[11] Patent Number: 4,808,838

[45] Date of Patent: Feb. 28, 1989

[54] COLLIMATED THERMAL NEUTRON POROSITY TOOL

[75] Inventor: Randy Gold, Houston, Tex.

[73] Assignee: Halliburton Company, Duncan, Okla.

[21] Appl. No.: 59,453

[22] Filed: Jun. 8, 1987

Related U.S. Application Data

[63] Continuation-in-part of Ser. No. 672,024, Nov. 16, 1984.

[51] Int. Cl.⁴ .............................................. G01V 5/00
[52] U.S. Cl. ................................... 250/266; 250/265
[58] Field of Search ............... 250/266, 264, 265, 269, 250/370

[56] References Cited

U.S. PATENT DOCUMENTS 3,823,319  7/1974  Tittman ............................. 250/265
4,581,532  4/1986  Givens et al. ...................... 250/266

*Primary Examiner*—Craig E. Church
*Assistant Examiner*—Richard Hanig
*Attorney, Agent, or Firm*—William J. Beard

[57] ABSTRACT

For use in measuring thermal neutron activity in an open or cased hole, the preferred and illustrated embodiment of the present apparatus sets forth a porosity tool. The device incorporates one or more thermal neutron detectors in a sonde having a pressure housing adapted to be lowered into a borehole. The thermal neutron detector(s) is decentralized by placing it adjacent to one side of the pressure housing, and a decentralizer spring is placed on the exterior of the housing opposite the detector; this locates the detector much closer to the formation and reduces the intervening borehole fluid and the impact of borehole geometry on the data so obtained. Moreover, the decentralized detector is protected on the side of the detector away from the formation by placing a shield reducing the thermal neutron flux from that direction toward the detectors. In the preferred embodiment, the shield is cadmium and forms an approximate semi-cylinder about the detector.

3 Claims, 1 Drawing Sheet

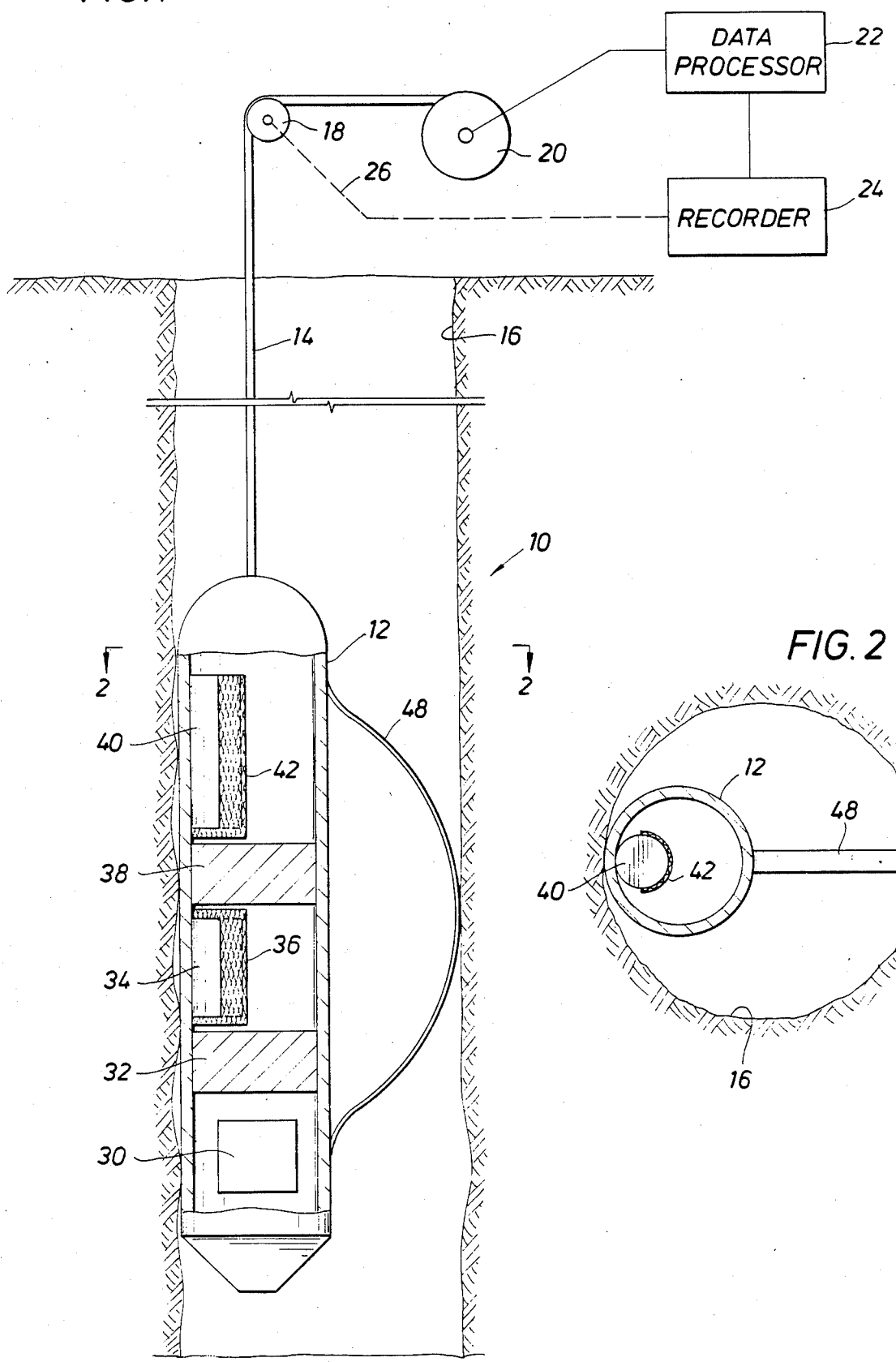

COLLIMATED THERMAL NEUTRON POROSITY TOOL

This application is a continuation of copending application of Ser. No. 672,024 filed Nov. 16, 1984, which copending parent application is hereby abandoned with the filing of this application.

BACKGROUND OF THE DISCLOSURE

This disclosure is directed to a thermal neutron porosity logging apparatus. This is a tool adapted to be lowered on an armored logging cable into a well bore, either cased or open hole. The device is enclosed in a sonde suspended on the logging cable. The sonde is lowered to a depth whereupon thermal neutron flux can be measured by detectors within the sonde.

A thermal neutron flux measurement is dependent in part on formation lithology, the nature of the fluid which fills the pores of the formation, and formation porosity. While these factors influence thermal neutron flux in a manner which enables the formation porosity to be determined (knowing the nature of the fluid and formation lithology), there are other factors which detract from use of thermal neutron flux measurements to obtain formation porosity. As an example, the borehole geometry and the positioning of the detector in the borehole are factors which alters the neutron flux rate. Moreover, the fluid that fills the borehole may also influence the neutron flux, either increasing or decreasing the count rate depending on the fluids thermal neutron capture cross section. Thus, the nature of the fluid and the volume of fluid observed by the neutrons alters the measured flux rate. The borehole geometry and the nature of the fluid are sources of correction factors necessary to obtain a useful observed count rate for determining a corrected form of formation porosity.

If the amouth of fluid interposed between the detector and the formation is reduced, variations arising from fluid capture cross section are thereby reduced. Further, more accurate measurements of neutron flux absent borehole geometry alterations in the measured value can be obtained by decentralizing the detector. It is desirable therefore to decentralize the detector within the sonde which encloses the detector and the associated electronic equipment that goes with it. Within the sonde, the detector is thus located as near as possible to one side and a decentralizing spring is located on the exterior opposite the detector. In typical installations, two detectors are used and they are located at a common aligned position to the side, both opposed by the decentralizing spring.

This embodiment thus contemplates the decentralizing of detectors and positioning an encircling shield for reducing thermal neutrons from approaching the detectors. That is, the shield is located on the side of the detectors facing the decentralizing spring. Upon decentralization of the detectors, the shielding protects against the neutron flux subject to the greatest influence by borehole geometry and fluid capture cross section.

Thus, the shielding reduces the impact of the borehole fluid and geometry on the backside of the detectors. In that sense, the shield collimates the detector in preference to thermal neutrons impinging from the formation, and prevents counting of thermal neutrons impinging from the borehole on the backside.

The foregoing in very general terms sets forth the nature of the present apparatus, but the apparatus is more readily understood on reading of the below written specification in conjunction with the drawings.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a sectional view through a collimated thermal neutron porosity tool in accordance with the teachings of the present disclosure in an open borehole showing a decentralizer spring which urges the tool against the wall of the borehole; and FIG. 2 is a sectional view along the line 2—2 of FIG. 1 showing details of construction of the decentralized detector and tool body.

DETAILED DESCRIPTION OF THE PREFERRED EMBODIMENT

Attention is first directed to FIG. 1 of the drawings where the numeral 10 identifies the collimated thermal neutron porosity tool of the present disclosure. It comprises a sonde having a pressure housing 12 suspended on an armored logging cable 14 and adapted to be lowered in a well that is either cased or uncased. FIG. 1 shows an uncased hole. The logging cable 12 extends upwardly to the surface and passes over a sheave 18. The cable is spooled or stored on a drum 20. The data observed by the equipment within the sonde 12 (described below) is converted into signals which are transferred up the logging cable 14. The conductors of the cable 14 are connected to a data processor 22. It converts the signals into suitable recordable data which is output to a recorder 24. By means of an electronic or mechanical measuring apparatus 26 connected to the sheave 18, a signal indicative of depth is transferred to the recorder so that the data is recorded as a function of sonde depth.

Going now to the sonde, it will be observed that the sonde is a pressure housing adapted to isolate the equipment within from the external pressures. Moreover, it is a housing which is constructed so that it is transparent, or substantially so, to thermal neutrons so that they are observed by the detectors within the housing. A neutron source 30 is enclosed within the sonde 12. It is a source of neutron flux bombarding the adjacent formation; the formation provides a response ultimately detected by the detectors to be described. This will be noted in detail hereinafter. The neutron source 30 is isolated by shielding 32. The shielding is preferably formed of iron, brass or tungsten or a combination thereof. The shielding 32 prevents direct neutron bombardment of the detectors. Moreover, the detectors are enclosed by shielding 36 and 42. A similar shield 38 to the shield 32 is located above the detector 36. Another detector 40 (which is similar to the detector 34) is also enclosed in the housing 12. It is enclosed in a shield 42. The detectors 34 and 40 are of similar type differing in location. One is closer to the neutron source 30 then the other. To this end, one can be termed the near detector and the other is the far detector, referring to their spacing from the neutron source 30.

The detectors 34 and 40 are normally fabricated as elongate cylindrical bodies. They are mounted at one side; as viewed in FIG. 2, they are aligned with one another at a common side of the pressure housing. Because they are generally cylindrical in shape, the shields 36 and 42 that are placed around them are generally cylindrical in shape also. Moreover, they are capped across the ends. Thus, FIG. 2 shows the shield 42 to comprise a semi-cylinder encircling the detector body. The detectors are mounted so that they are decentralized in pressure housing 12 and very close to an edge or side of the pressure housing 12 and are exposed to thermal neutrons from the region near the exterior of the pressure housing. Thermal neutrons impinging through the central part of the pressure housing are shielded by the shields about the detectors. Normally, the shield is cadmium but other materials useful for shielding purposes include tungsten also.

As will be observed in FIG. 2, the detectors are located at one side of the pressure housing. Diametrically opposite of the detectors, a decentralizer spring 48 is positioned exterior of the presure housing. As shown in FIG. 1, it is a bow spring positioned to contact the opposite side of the borehole 16 to decentralize the pressure housing; just as importantly, it urges the pressure housing against the opposite side of the borehole. It will be observed, in the sectional view of FIG. 2, that this accomplishes a significant shortening and substantial elimination of distance wherein fluids in the borehole 12 are located between the detectors and the formation. The bow spring 48 imposes a load on the pressure housing to assure that it is forced to the side as the device is retrieved from the well.

As stated originally, porosity is one of the functions determining thermal neutron flux. Assuming a knowledge of the formation lithology and the type of fluid which is in the pores of the formation, the porosity can be determined inferentially from thermal neutron flux. The data is improved in quality and is much more reliable. Data is made less sensitive to borehole geometry and fluid capture cross section. Thus, centralizing the detectors 34 and 40 significantly degrades the quality of data. Through the use of this tool, the thermal neutron flux background level is reduced, and significant improvements can be obtained in data from the system. Moreover, the decentralized construction shown in the drawings is able to obtain an increase in sensitively, or restated, a decrease in sensitivity to borehole geometry. This therefore enables an increase in the dynamic range of the equipment. Lastly, the decentralized arrangement enables the obtaining of data from both detectors which is significantly free of the factors which distort the data.

In the event the detectors have different geometry, shields can be shaped to accommodate such a geometry. The spacing of the detectors from the source 30 can likewise be similar to that found in centralized detector construction.

The foregoing is directed to the preferred embodiment, the scope is determined by the claims which follow.

What is claimed is:

1. A thermal neutron detector system adapted to be lowered in a cased or uncased borehole comprising:

(a) a pressure housing having a cylindrical wall and adapted to be lowered in a borehole and to enclose means therein to form output signals provided to a logging cable;

(b) near and far thermal neutron detector means in said housing, and including means mounting said detector means immediately adjacent to the wall of said housing and off center with regard to an elongate axis thereof;

(c) said near and far thermal neutron detector means both being
 (1) elongate cylindrical chambers,
 (2) having a sensitive interior volume filled with helium 3 and being responsive to thermal neutrons;
 (3) between spaced ends thereof;

(d) Thermal neutron shield means fitting partially about each of said cylindrical detector means and isolating the spaced ends thereof and also having an elongate partially cylindrical portion to leave an unshielded window portion located along the length of said detector means and wherein said window portion is positioned adjacent to the wall of said housing so that said thermal neutron shield means shields against thermal neutrons impinging on said detector means passing through central positions of said housing, said thermal neutron shield means comprising a semicircular cross section cadmium sleeve snugly and concentrically fitted about said cylindrical detector means and encircling about one half thereof and wherein said window portion comprises approximately one half of a circumference therearound, said window portion extending lengthwise along said cylindrical chambers, said thermal neutron shield means being formed of a form fitted layer of cadmium foil of approximately uniform thickness and having a circular end covering sized equal to the cylindrical chamber diameter;

(e) two circular second shield means separate from said thermal neutron shield means and extending fully transverse of said housing to isolate said near far detector means above and below said detector means; and (f) means on the exterior or said housing for decentralizing said housing in the borehole, said means operative to decentralize said housing to thereby position said detector means close to the formation penetrated by the borehole to position said detector means to detect thermal neutrons from the formation entering through said window portions, said window portions comprising approximately one half the circumference of said detector means.

2. The apparatus of claim 1 including radiation source in said housing located at a remote portion of said housing from said detector means and wherein said second shield means comprises two shield partitions across said housing to isolate said radiation source and each of said detector means.

3. The apparatus of claim 1 wherein said thermal neutron shield means on said far detector means comprises an end covering said far detector means at its end facing the near detector means, and said thermal neutron shield means on said near detector means covers both ends thereof.

* * * * *